United States Patent
Fassnacht et al.

(10) Patent No.: US 8,448,124 B2
(45) Date of Patent: May 21, 2013

(54) POST TIMING LAYOUT MODIFICATION FOR PERFORMANCE

(75) Inventors: Uwe Fassnacht, Tuebingen (DE); Veit Gernhoefer, Holzgerlingen (DE); Michael S. Gray, Fairfax, VT (US); Joachim Keinert, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/236,977

(22) Filed: Sep. 20, 2011

(65) Prior Publication Data

US 2013/0074025 A1   Mar. 21, 2013

(51) Int. Cl.
*G06F 17/50*   (2006.01)
*G06F 9/455*   (2006.01)

(52) U.S. Cl.
USPC .............................. 716/134; 716/113; 716/119

(58) Field of Classification Search
USPC .......................................... 716/113, 134, 119
See application file for complete search history.

(56) References Cited

U.S. PATENT DOCUMENTS

| | | | |
|---|---|---|---|
| 6,974,981 B2 | 12/2005 | Chidambarrao et al. | |
| 6,982,433 B2 | 1/2006 | Hoffman et al. | |
| 7,091,563 B2 | 8/2006 | Chidambarrao et al. | |
| 7,118,999 B2 | 10/2006 | Yang et al. | |
| 7,144,767 B2 | 12/2006 | Chidambarrao et al. | |
| 7,279,746 B2 | 10/2007 | Doris et al. | |
| 7,374,987 B2 | 5/2008 | Chidambarrao et al. | |
| 7,932,542 B2 * | 4/2011 | Berthold et al. | 257/202 |
| 2005/0268263 A1 * | 12/2005 | Sun et al. | 716/6 |
| 2007/0202652 A1 | 8/2007 | Moroz et al. | |
| 2009/0079023 A1 | 3/2009 | Berthold et al. | |
| 2009/0113368 A1 | 4/2009 | Lin et al. | |
| 2010/0070944 A1 * | 3/2010 | Wu et al. | 716/21 |
| 2010/0270597 A1 | 10/2010 | Sproch et al. | |
| 2010/0293514 A1 * | 11/2010 | Liu et al. | 716/6 |

OTHER PUBLICATIONS

Joshi, Vivek et al., "Leakage Power Reduction Using Stress-Enhanced Layouts", Proceedings of the 45th Annual Design Automation Conference (DAC'08), Anaheim, California, Jun. 9-13, 2008, pp. 912-917.

Joshi, Vivek et al., "Stress aware layout optimization", http://portal.acm.org/citation.cfm?id=1353666, Abstract, printed Apr. 25, 2011, 1 page.

Ma, Terry et al., "Addressing Process Variation in 45nm Designs", Synopsys Insight, http://www.synopsys.com/news/pubs/insight/2007/art2_45nm_v2s2.html?cmp=NLCinsight&Link=Feb07_V2-l2_Art2, printed Feb. 4, 2011, 3 pages.

(Continued)

*Primary Examiner* — Stacy Whitmore
*Assistant Examiner* — Magid Dimyan
(74) *Attorney, Agent, or Firm* — Stephen R. Tkacs; Stephen J. Walder, Jr.; Matthew B. Talpis

(57) ABSTRACT

A mechanism is provided for post timing layout modification for performance. The mechanism selectively applies layout modification based on timing analysis at the path level. The mechanism applies stress only to transistors that are in a setup critical path without applying stress to transistors in hold critical paths. The mechanism may use a method to apply stress to improve performance of a transistor in a setup critical path, as long as the stress does not also improve performance of a neighboring transistor in a hold critical path. In some instances, the mechanism may apply stress to improve performance of a transistor in a setup critical path while simultaneously degrading performance of a transistor in a hold critical path.

20 Claims, 4 Drawing Sheets

OTHER PUBLICATIONS

Verghese, Nishath et al., "Modeling Stress-Induced Variability Optimizes IC Timing Performance", Cadence, White Paper, http://www.cadence.com/d/Resources/white_papers/managing_stress_wp.pdf, 2010, 10 pages.

Yang, H. S. et al., "Dual Stress Liner for High Performance sub-45nm Gate Length SOI CMOS Manufacturing", IEEE International Electron Devices Meeting, IEDM Technical Digest, Dec. 13-15, 2004, pp. 1075-1077.

* cited by examiner

| EFFECT OF NW EDGE MOVEMENT ON PERFORMANCE | LONGITUDINAL MOVEMENT OF NW EDGE | TRANSVERSE MOVEMENT OF NW EDGE |
|---|---|---|
| INCREASE NFET PERFORMANCE | AWAY | AWAY |
| INCREASE PFET PERFORMANCE | AWAY | CLOSER |
| DECREASE NFET PERFORMANCE | CLOSER | CLOSER |
| DECREASE PFET PERFORMANCE | CLOSER | AWAY |

POST TIMING LAYOUT MODIFICATION FOR PERFORMANCE

BACKGROUND

The present application relates generally to an improved data processing apparatus and method and more specifically to mechanisms for post timing layout modification for performance.

An integrated circuit (IC), also referred to as a chip or microchip, is an electronic circuit manufactured by the patterned diffusion of dopants into the surface of a thin substrate of semiconductor material. Integrated circuits are used in virtually all electronic equipment today and have revolutionized the world of electronics. Computers, cellular phones, and other digital appliances are now inextricable parts of the structure of modern societies, made possible by the low cost of production of integrated circuits. Very-large-scale integration (VLSI) is the process of creating integrated circuits by combining millions of transistors into a single chip.

Static timing analysis (STA) is a method of computing the expected timing of a digital circuit without requiring simulation. High-performance integrated circuits have traditionally been characterized by the clock frequency at which they operate. Gauging the ability of a circuit to operate at the specified speed requires ability to measure, during the design process, its delay at numerous steps. Moreover, delay calculation must be incorporated into the inner loop of timing optimizers at various phases of design, such as logic synthesis, layout (placement and routing), and in in-place optimizations performed late in the design cycle.

While such timing measurements can theoretically be performed using a rigorous circuit simulation, such an approach is liable to be too slow to be practical. Static timing analysis plays a vital role in facilitating the fast and reasonably accurate measurement of circuit timing. The speedup appears due to the use of simplified delay models, and on account of the fact that its ability to consider the effects of logical interactions between signals is limited.

Integrated circuits include many transistors. Commonly, transistors are metal-oxide-semiconductor field-effect transistor (MOSFET) devices. MOSFETs include a gate, source, and drain. The source and drain are connected to individual highly doped regions that are separated by the body region. These regions can be either p or n type, but they must both be of the same type, and of opposite type to the body region. These regions are often referred to as the p-well or n-well. If the MOSFET is an NFET, then the source and drain are 'n+' regions and the body is a 'p' region. If the MOSFET is a PFET, then the source and drain are 'p+' regions and the body is an 'n' region.

One may increase chip performance by adding layout structures to apply n-well stress, or p-well stress. Currently, this is done on each transistor regardless of its impact on timing. Device extraction is required because gate level timing would not see this effect. Yet, device extraction and transistor-level timing is not feasible on large scale circuits, such as chip units or complete chips, due to long run times. Also, the blind application of performance improvements to any timing path may cause hold-time violations in fast paths. Applying n-well or p-well stress increases the mobility of charge carriers, which increases switching speed, thus increasing performance.

SUMMARY

In one illustrative embodiment, a method, in a data processing system, is provided for layout modification for performance. The method comprises receiving an integrated circuit design and performing static timing analysis on the integrated circuit design. The method further comprises marking each gate in the integrated circuit design that is part of a hold critical path as hold critical and marking each gate in the integrated circuit design that is part of a setup critical path as setup critical. The method further comprises for a first transistor in a first gate marked as setup critical, determining whether performing a layout modification to increase performance of the given transistor results in increasing performance for a second transistor in a gate marked as hold critical. The method further comprises responsive to a determination that performing the layout modification to increase performance of the first transistor does not result in increasing performance of a second transistor in a second gate marked as hold critical, performing the layout modification to increase performance of the first transistor.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for post timing layout modification for performance. The mechanism selectively applies layout modification based on timing analysis at the path level. The mechanism enhances performance limited yield and simultaneously ensures that the layout modification does not cause hold violations.

Figure 1:
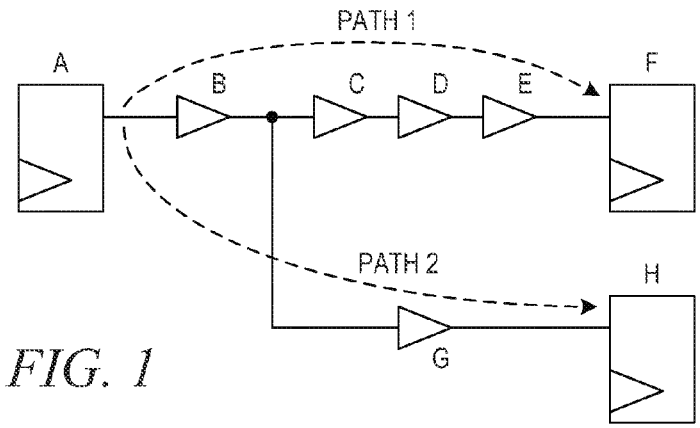
FIG. 1 is a diagram of an example integrated circuit on which aspects of the illustrative embodiments may be applied.

FIG. 1 is a diagram of an example integrated circuit on which aspects of the illustrative embodiments may be applied. The circuit in FIG. 1 may be a portion of a very large scale integrated circuit. The integrated circuit has two paths from latch A to latch F and latch H. Path 1 begins at latch A, through delay components B-E, to latch F. Path 2 begins at latch A, through delay components B and G, to latch H.

In the integrated circuit shown in FIG. 1, path 1 is a setup critical path. A setup critical path is a path through the logic through which a data signal arrives just in time to be captured correctly. Any additional delay in these types of paths would lead to non-functional hardware and must be avoided. Path 2 is a hold critical path. Hold critical paths are paths through the logic that are just barely long enough to ensure that the right data is captured. Decreasing the delay through these paths would also lead to non-functional hardware.

It is generally desired to improve performance (i.e., increase speed) of integrated circuit components. One may increase chip performance by adding layout structures to apply n-well stress or p-well stress. Known methods for applying stress can be considered to fall in two categories. One method for applying stress involves depositing material or forming structures on either NFETs or PFETs to improve performance. As there is a proximity effect, neighboring FETs of the same type are affected also.

Methods like dual stress liner (DSL) apply to a border between NFETs and PFETs. This affects PFETs and neighboring NFETs, and vice versa. The effect (improvement/degradation) on the neighboring transistors depends on the orientation (horizontal/vertical channel) and the type (NFET/PFET).

Figure 2:
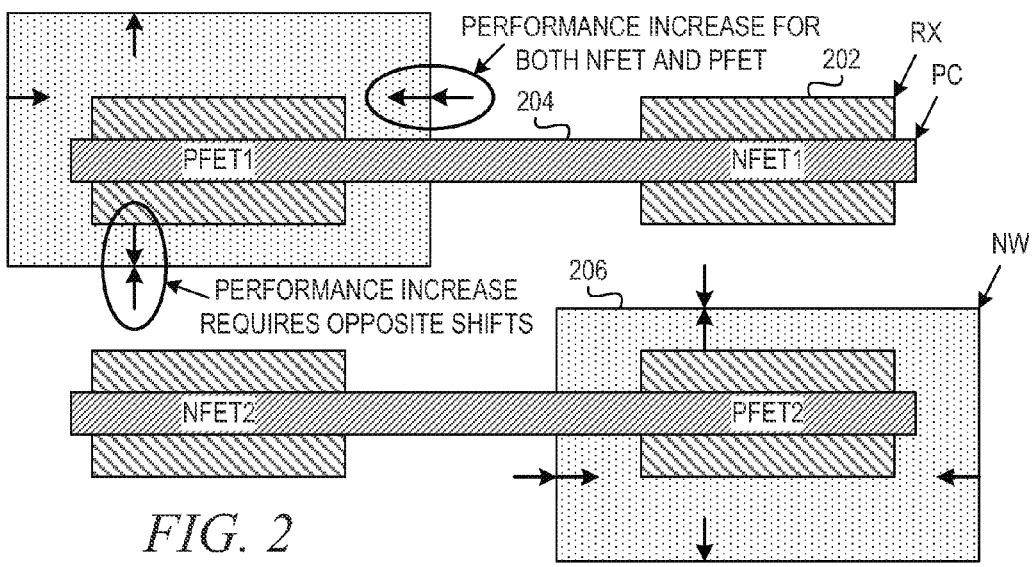
FIG. 2 is a diagram illustrating transistors and the effects of applying stress in accordance with the illustrative embodiments.

FIG. 2 is a diagram illustrating transistors and the effects of applying stress in accordance with the illustrative embodiments. PFET1 neighbors NFET2 longitudinally and neighbors NFET1 in the transverse direction with respect to the direction of the channel, while PFET2 neighbors NFET2 in the transverse direction and neighbors NFET1 in the longitudinal direction. RX 202 is diffusion (active region), PC 204 is polysilicon (conductor forming the gate over the active region), NW 206 is the n-well implant for PFETs. The "direction of the channel" is usually associated with the charge flow direction in the channel, which is perpendicular to the long edges of the gate. The n-well (NW) forms a border between each PFET and neighboring NFET.

Figures 3, 4:
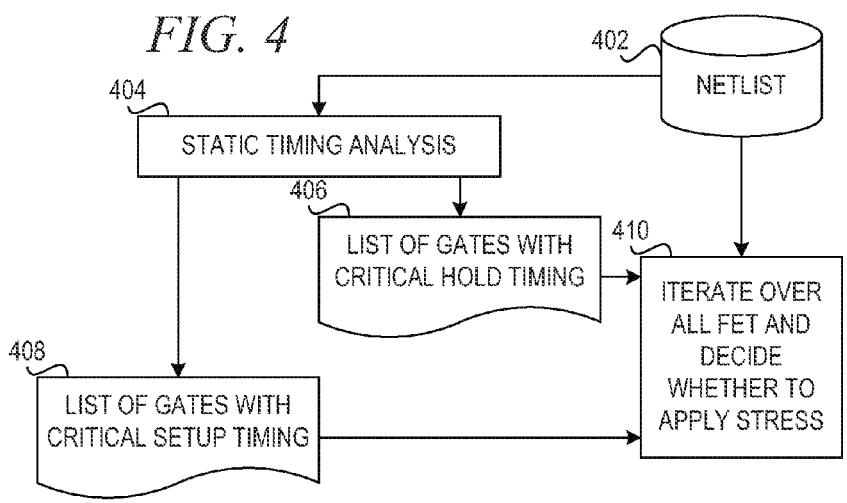
FIG. 3 is a table that shows the effect of applying stress on transistors in accordance with the illustrative embodiments.
FIG. 4 is a flow diagram illustrating operation of layout modification for performance in accordance with an illustrative embodiment.

FIG. 3 is a table that shows the effect of applying stress on transistors in accordance with the illustrative embodiments. Moving the NW edge away in the longitudinal direction (direction of the channel) increases performance of an NFET and of the PFET. Moving the NW edge closer in the longitudinal direction decreases performance of the NFET and the PFET. Moving the NW edge away in the transverse direction (direction orthogonal to channel) increases performance of the NFET and decreases performance of the PFET. Moving the NW edge closer in the transverse direction decreases performance of the NFET and increases performance of the PFET.

As shown in FIG. 2, there are situations where moving the NW edge results in a performance increase for both PFET and its neighboring NFET. There are also situations where a performance increase requires opposite shifts of the NW edge.

In accordance with an illustrative embodiment, a mechanism is provided for performing gate level timing. The mechanism determines critical paths for hold-violations, which are typically those with a hold-timing slack up to a defined limit (e.g., zero slack). The mechanism also determines critical paths for setup-violations, which are typically those with a setup-timing slack up to a defined limit (e.g., zero slack).

The mechanism marks blocks contained in above paths as "setup critical" or "hold critical." Optionally, the mechanism may not mark blocks in clock distribution paths. The mechanism may also not mark non-timed blocks (e.g., analog circuits). In addition, the mechanism may leave spare cells and gate array fillers unmarked. The mechanism may propagate gate level markers to layout shapes of the transistors contained in those blocks.

The mechanism applies layout modifications that enhance performance to transistors marked as "setup critical," but not to the transistors marked as "hold critical." Optionally, the mechanism may also apply these layout modifications to the spare cells and gate array filler. The mechanism may apply layout modifications that degrade performance to transistors marked as "hold critical" but not to transistors marked as "setup critical."

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 4 is a flow diagram illustrating operation of layout modification for performance in accordance with an illustrative embodiment. Netlist file 402 conveys connectivity information and provides instances, nets, and perhaps some attributes of components of an integrated circuit design. Most netlists either contain or refer to descriptions of the parts or devices used. Each time a part is used in a netlist, this is called an "instance." Thus, each instance has a "master," or "definition." These definitions will usually list the connections that can be made to that kind of device, and some basic properties of that device. An "instance" could be anything from a transistor (NFET or PFET), to a resistor, capacitor, or logic gate.

The mechanism of the illustrative embodiments performs static timing analysis 404 on netlist 402. From static timing analysis 404, the mechanism forms a list of gates with critical hold timing 406 and a list of gates with critical setup timing 408. The mechanism then iterates over all transistors and decides whether to apply stress to each individual transistor 410.

The determination of whether to apply stress depends on whether a transistor is marked as "hold critical" or "setup critical." The determination also depends on whether the method used to apply stress allows for degradation of performance.

Figure 5:
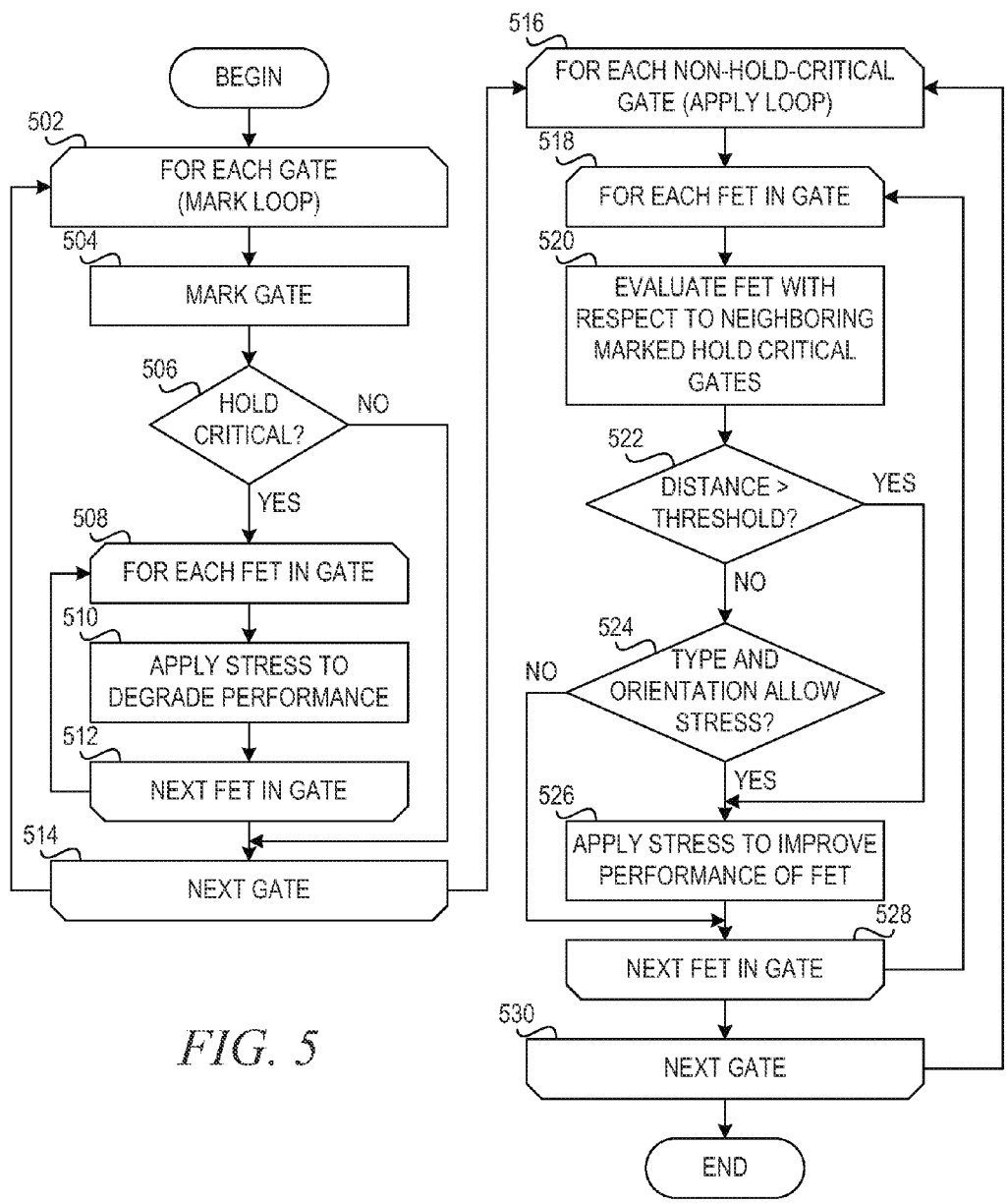
FIG. 5 is a flowchart illustrating operation of a mechanism for applying a stress method that allows for degradation in accordance with an illustrative embodiment.

FIG. 5 is a flowchart illustrating operation of a mechanism for applying a stress method that allows for degradation in accordance with an illustrative embodiment. Operation begins by receiving a netlist, and the mechanism begins a mark loop for each gate in the netlist (block 502). The mechanism marks the gate as "hold critical" or "setup critical" based on whether the current gate is in a hold critical path or a setup critical path (block 504).

If the current gate is not marked hold-critical (block 506: NO), the mechanism considers the next gate (block 514). If the current gate is "hold critical" (block 506: YES), then a loop over each transistor in the current gate begins (block 508), and the mechanism applies stress to degrade performance of the transistor (block 510). Thereafter, the mechanism considers the next transistor (block 512), and operation returns to block 508 to repeat the loop for the next transistor in the current gate. Note that the selection of hold critical paths in block 504 takes precedence over the selection of setup critical paths. Thus a gate that is in both a hold-critical and setup-critical path gets marked "hold critical" and not "setup critical."

If the current transistor is the last transistor in the current gate in block 512, the mechanism considers the next gate (block 514), and operation returns to block 502 to repeat the loop for the next gate in the netlist.

If the current gate is the last gate in the netlist in block 514, then the mechanism begins an apply loop for each non-hold-critical gate in the netlist (block 516). The mechanism begins a loop for each transistor in the current gate (block 518).

The mechanism evaluates the transistor with respect to neighboring marked hold critical gates (block 520). The mechanism determines whether the transistor is not in the vicinity (distance>threshold) of any transistor of a hold critical gate (block 522). If the transistor is in the vicinity of a transistor marked "hold critical" (block 522: NO), then the mechanism determines whether the type and orientation of transistors in the neighboring marked hold critical gates allow for application of stress to improve performance (block 524) by also degrading performance of the neighboring transistor in a hold critical gate.

If the transistor is not in the vicinity of any transistor marked "hold critical" (block 522: YES) or the type and orientation of transistors in the neighboring marked "hold critical" gates allow for application of stress (block 524: YES), then the mechanism applies stress to improve performance of the transistor (block 526). Thereafter, or if the type and orientation of transistors in the neighboring marked "hold critical" gates do not allow for application of stress to improve performance in block 524, the mechanism considers the next transistor in the gate (block 528), and operation returns to block 518 to repeat the loop for the next transistor. If the current transistor is the last transistor in the current gate in block 528, then the mechanism considers the next gate (block 530), and operation returns to block 516 to repeat the loop for the next gate in the netlist. If the current gate is the last gate in the netlist in block 530, then operation ends.

Thus, the mechanism may degrade performance of transistors that are marked "hold critical" and also improve performance of transistors that are marked "setup critical." The mechanism may use a method to apply stress to transistors that improve performance of a transistor in a setup critical path, as long as the stress does not also improve performance of a neighboring transistor in a hold critical path. In some instances, the mechanism may apply stress to improve performance of a transistor in a setup critical path while simultaneously degrading performance of a transistor in a hold critical path.

Figure 6:
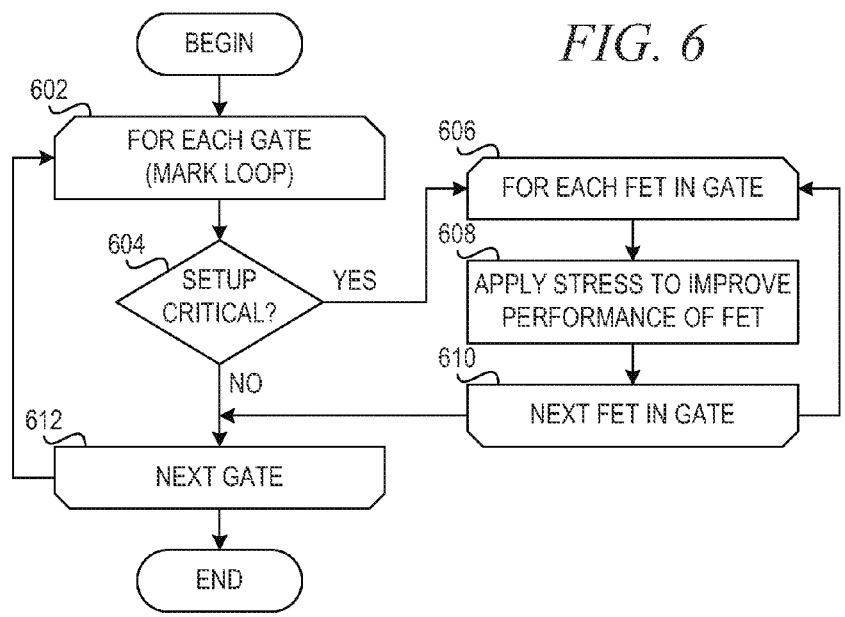
FIG. 6 is a flowchart illustrating operation of a mechanism for applying a stress method that does not allow for degradation in accordance with an illustrative embodiment.

FIG. 6 is a flowchart illustrating operation of a mechanism for applying a stress method that does not allow for degradation in accordance with an illustrative embodiment. Operation begins by receiving a netlist, and the mechanism begins a loop for each gate in the netlist (block 602). The mechanism determines whether the gate is in a setup critical path (block 604). If the gate is in a setup critical path, the mechanism begins a loop for each transistor in the gate (block 606). The mechanism applies stress to the current transistor to improve performance of the transistor (block 608). Thereafter, the mechanism considers the next transistor in the gate (block 610), and operation returns to block 606 to repeat the loop for the next transistor.

If the current transistor is the last transistor in the current gate in block 610, or if the current gate is not in a setup critical path in block 604, then the mechanism considers the next gate in the netlist (block 612), and operation returns to block 602 to repeat the loop for the next gate. If the current gate is the last gate in the netlist in block 612, then operation ends.

Thus, the mechanism applies stress only to transistors that are in a setup critical path without applying stress to transistors in hold critical paths. Optionally, the mechanism may not apply stress to transistors that are in clock distribution paths. Also, the mechanism may not apply stress to non-timed blocks, such as analog circuits. In addition, the mechanism may not apply stress to spare cells and gate array fillers. Alternatively, the mechanism may apply layout modifications to spare cells and gate array fillers.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
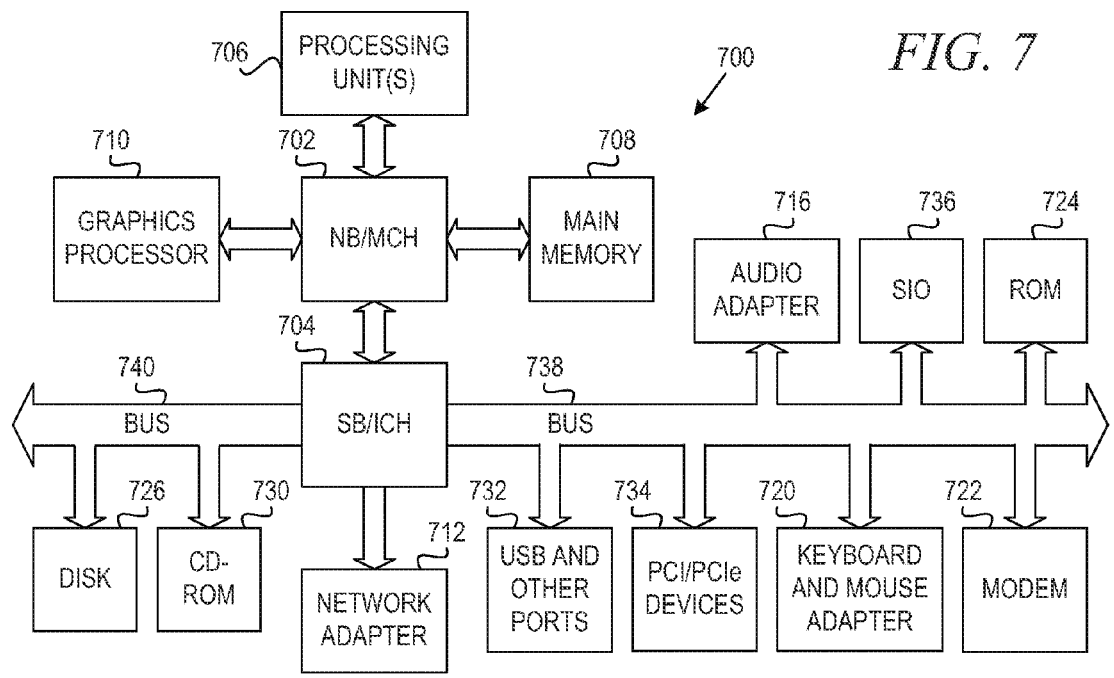
FIG. 7 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIG. 7 is provided hereafter as an example environment in which aspects of the illustrative embodiments may be implemented. It should be appreciated that FIG. 7 is only an example and is not intended to assert or imply any limitation with regard to the environments in which aspects or embodiments of the present invention may be implemented. Many modifications to the depicted environment may be made without departing from the spirit and scope of the present invention.

FIG. 7 is a block diagram of an example data processing system in which aspects of the illustrative embodiments may be implemented. Data processing system 700 is an example of a computer in which computer usable code or instructions implementing the processes for illustrative embodiments of the present invention may be located.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 may be connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 700 (Java is a trademark of Oracle and/or its affiliates.).

As a server, data processing system 700 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device which is configured with flash memory to provide non-volatile memory for storing operating system files and/or user-generated data, for example. Essentially, data processing system 700 may be any known or later developed data processing system without architectural limitation.

Thus, the illustrative embodiments provide mechanisms for post timing layout modification for performance. The mechanisms selectively apply layout modification based on timing analysis at the path level. The mechanisms enhance performance limited yield and simultaneously ensures that the layout modification does not cause hold violations. The mechanisms may also provide higher maximum frequency. The mechanisms reduce risk of hold violations and may reduce guard band to protect against hold violations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for layout modification for performance, the method comprising:
   receiving an integrated circuit design;
   performing static timing analysis using a static timing analysis tool on the integrated circuit design;
   marking each gate in the integrated circuit design that is part of a hold critical path as hold critical;
   marking each gate in the integrated circuit design that is part of a setup critical path and not part of a hold critical path as setup critical;
   for each given gate marked as hold critical, performing layout modification on each given transistor in the given gate to degrade performance of the given transistor;
   for a first transistor in a first gate marked as setup critical, determining whether performing a layout modification to increase performance of the first transistor results in increasing performance for a second transistor in a second gate marked as hold critical; and
   responsive to a determination that performing the layout modification to increase performance of the first transistor does not result in increasing performance of the second transistor, performing the layout modification to increase performance of the first transistor.

2. The method of claim 1, wherein the layout modification comprises applying n-well stress to the first transistor.

3. The method of claim 1, wherein determining whether performing the layout modification to increase performance of the first transistor results in increasing performance of the second transistor comprises:
   determining whether the first transistor is marked as hold critical.

4. The method of claim 1, wherein determining whether performing the layout modification to increase performance of the first transistor results in increasing performance of the second transistor comprises:
   determining whether the first transistor is not within a predetermined distance of the second transistor.

5. The method of claim 1, wherein determining whether performing the layout modification to increase performance of the first transistor results in increasing performance of the second transistor comprises:
   determining whether a type and orientation of the second transistor with respect to the first transistor allows for performing the layout modification to increase performance of the first transistor.

6. The method of claim 1, wherein the layout modification comprises applying n-well stress to the first transistor;
   wherein determining whether performing the layout modification to increase performance of the first transistor results in increasing performance of the second transistor comprises determining whether the first transistor is not within a predetermined distance of the second transistor;

wherein determining whether performing the layout modification to increase performance of the first transistor results in increasing performance of the second transistor comprises determining whether a type and orientation of the second transistor with respect to the first transistor allows for performing the layout modification to increase performance of the first transistor; and wherein performing the layout modification to increase performance of the first transistor degrades performance of the second transistor.

7. A computer program product comprising a computer readable storage medium having a computer readable program stored therein, wherein the computer readable program, when executed on a computing device, causes the computing device to:

receive an integrated circuit design;

perform static timing analysis on the integrated circuit design;

mark each gate in the integrated circuit design that is part of a hold critical path as hold critical;

mark each gate in the integrated circuit design that is part of a setup critical path and not part of a hold critical path as setup critical;

for each given gate marked as hold critical, perform layout modification on each given transistor in the given gate to degrade performance of the given transistor;

for a first transistor in a first gate marked as setup critical, determine whether performing a layout modification to increase performance of the first transistor results in increasing performance for a second transistor in a second gate marked as hold critical; and responsive to a determination that performing the layout modification to increase performance of the first transistor does not result in increasing performance of the second transistor, perform the layout modification to increase performance of the first transistor.

8. The computer program product of claim 7, wherein the layout modification comprises applying n-well stress to the first transistor.

9. The computer program product of claim 7, wherein determining whether performing the layout modification to increase performance of the first transistor results in increasing performance of the second transistor comprises:

determining whether the first transistor is marked as hold critical.

10. The computer program product of claim 7, wherein determining whether performing the layout modification to increase performance of the first transistor results in increasing performance of the second transistor comprises:

determining whether the first transistor is not within a predetermined distance of the second transistor.

11. The computer program product of claim 7, wherein determining whether performing the layout modification to increase performance of the first transistor results in increasing performance of the second transistor comprises:

determining whether a type and orientation of the second transistor with respect to the first transistor allows for performing the layout modification to increase performance of the first transistor.

12. The computer program product of claim 7, wherein the layout modification comprises applying n-well stress to the first transistor;

wherein determining whether performing the layout modification to increase performance of the first transistor results in increasing performance of the second transistor comprises determining whether the first transistor is not within a predetermined distance of the second transistor;

wherein determining whether performing the layout modification to increase performance of the first transistor results in increasing performance of the second transistor comprises determining whether a type and orientation of the second transistor with respect to the first transistor allows for performing the layout modification to increase performance of the first transistor; and wherein performing the layout modification to increase performance of the first transistor degrades performance of the second transistor.

13. The computer program product of claim 7, wherein the computer readable program is stored in a computer readable storage medium in a data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system for use in a computer readable storage medium with the remote system.

15. An apparatus, comprising:

a processor; and a memory coupled to the processor, wherein the memory comprises instructions which, when executed by the processor, cause the processor to:

receive an integrated circuit design;

perform static timing analysis on the integrated circuit design;

mark each gate in the integrated circuit design that is part of a hold critical path as hold critical;

mark each gate in the integrated circuit design that is part of a setup critical path and not part of a hold critical path as setup critical;

for each given gate marked as hold critical, perform layout modification on each given transistor in the given gate to degrade performance of the given transistor;

for a first transistor in a first gate marked as setup critical, determine whether performing a layout modification to increase performance of the given transistor results in increasing performance for a second transistor in a gate marked as hold critical; and responsive to a determination that performing the layout modification to increase performance of the first transistor does not result in increasing performance of a second transistor in a second gate marked as hold critical, perform the layout modification to increase performance of the first transistor.

16. The apparatus of claim 15, wherein the layout modification comprises applying n-well stress to the first transistor.

17. The apparatus of claim 15, wherein determining whether performing the layout modification to increase performance of the first transistor results in increasing performance of the second transistor comprises:

determining whether the first transistor is marked as hold critical.

18. The apparatus of claim 15, wherein determining whether performing the layout modification to increase performance of the first transistor results in increasing performance of the second transistor comprises:

determining whether the first transistor is not within a predetermined distance of the second transistor.

19. The apparatus of claim 15, wherein determining whether performing the layout modification to increase performance of the first transistor results in increasing performance of the second transistor comprises:
  determining whether a type and orientation of the second transistor with respect to the first transistor allows for performing the layout modification to increase performance of the first transistor.

20. The apparatus of claim 15, wherein the layout modification comprises applying n-well stress to the first transistor;
  wherein determining whether performing the layout modification to increase performance of the first transistor results in increasing performance of the second transistor comprises determining whether the first transistor is not within a predetermined distance of the second transistor;
  wherein determining whether performing the layout modification to increase performance of the first transistor results in increasing performance of the second transistor comprises determining whether a type and orientation of the second transistor with respect to the first transistor allows for performing the layout modification to increase performance of the first transistor; and
  wherein performing the layout modification to increase performance of the first transistor degrades performance of the second transistor.

* * * * *